G. NEBEKER.
Apparatus for Agitating and Heating Substances.
No. 55,886.
Patented June 26, 1866.
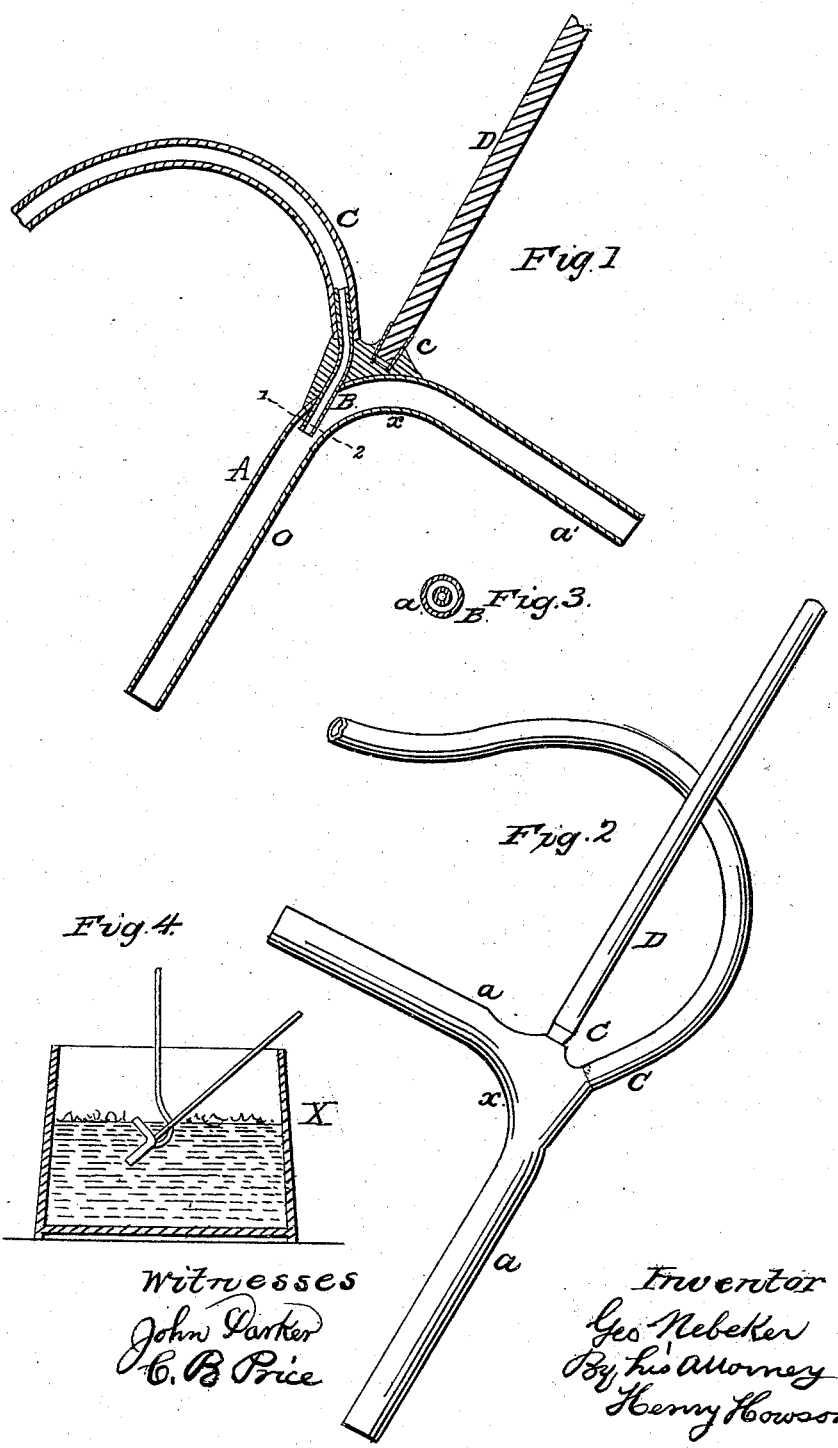

UNITED STATES PATENT OFFICE.

GEORGE NEBEKER, OF WILMINGTON, DELAWARE.

APPARATUS FOR AGITATING AND HEATING SUBSTANCES.

Specification forming part of Letters Patent No. 55,886, dated June 26, 1866.

*To all whom it may concern:*

Be it known that I, GEORGE NEBEKER, of Wilmington, Delaware, have invented an Instrument for Agitating and Heating Substances; and I do hereby declare the following to be a full, clear, and exact description of the same, reference being had to the accompanying drawings, and to the letters of reference marked thereon.

My invention consists of a tube combined with an internal pipe which communicates with a steam-boiler, as fully described hereinafter, so that when the instrument is introduced into a fluid or semi-fluid material and a current of steam is admitted to the internal pipe the material will be rapidly and thoroughly agitated and heated.

In order to enable others to make and use my invention, I will now proceed to describe its construction and operation.

On reference to the accompanying drawings, which form a part of this specification, Figure 1 is a sectional view of my instrument for agitating and heating substances; Fig. 2, an external view; Fig. 3, a section on the line 1 2, Fig. 1; and Fig. 4, a view illustrating one mode of using the instrument.

A is a metal tube, which is curved at $x$ so as to form two arms, $a$ and $a'$, at right angles, or nearly at right angles, to each other.

Through the curved portion $x$ of the tube projects a pipe, B, the inner end of which extends into and is central with the arm $a$, and to the outer end of this pipe B is connected a flexible pipe, C, which communicates with the steam-space of a boiler.

Into a socket, $c$, fits the lower end of a detachable wooden rod or handle, D.

In order to illustrate the mode in which this instrument is used, I will first proceed to describe the manner in which it may be employed in operations connected with brewing.

It has heretofore been customary to introduce the malt, with heated water, into a large vat or "mash-tub," X, Fig. 4, and then to stir and mix the whole mass by means of paddles or blades.

In order that the mixture may remain heated for the proper length of time, additional quantities of heated water are introduced at intervals, portions of the liquor already in the tub being withdrawn and introduced into a copper.

After the whole of the liquor has been removed from the mash-tub and placed in the copper, hops are thrown into the latter and a fire is kindled beneath the vessel, so as to raise the contents to the boiling-point, and after being thus heated for several hours the liquor is drawn off and passed through a suitable cooling apparatus.

Inasmuch as the contents of the mash-tub are merely heated by the occasional introduction of heated water, the temperature of the mash will vary continually, being highest immediately after the introduction of the water, while some portions of the malt with which the water is first brought in contact are more highly heated than others, so that the soluble matters in the malt are but partially extracted. This operation is also tedious, laborious, and requires the constant attention of several men.

In boiling the extract great care is required to maintain the mixture in constant agitation, that the insoluble portions may not settle to the bottom of the vessel, where they would be burned.

When the above-described instrument is used the water and malt to be heated are first introduced cold into the mash-tub. The attendant then holds the instrument by the handle D, plunges the tube A below the surface of the liquor, and admits the steam from the boiler into the tube C. As the current of steam passes from the pipe B through the arm $a$ it forces from the latter the liquor in the same and creates a partial vacuum in the arm $a'$, so that the material which flows into this arm is carried into the arm $a$, from which it is discharged in a rapid and continuous current.

As the attendant moves the instrument from one side of the tub to the other the whole mass is soon thoroughly agitated and mixed, while the heated steam thus brought into intimate contact with every portion of the mash gradually raises the whole to the temperature required.

Should the malt collect in such a mass at any one point in the tub that the current of combined steam and liquor expelled from the arm $a$ is not sufficiently strong to displace it, the attendant directs the arm $a$ toward the mass to be removed and turns the instrument so as to raise the end of the arm $a'$ for an instant above the surface of the liquor and admit a quantity of air into the same, Fig. 4, when the liquor will be so thoroughly agitated that the entire mass of malt will be disturbed and the particles separated to such an extent that they may be readily displaced by introducing the instrument among them.

After the mixture has been brought to the proper temperature and has been allowed to stand for a short time, it is drawn off into another vat, when the proper quantity of hops is thrown into the same. The instrument is then introduced into the liquor and the steam is turned on, as before, the end of the tube $a$ being held near the surface, so as to create a downward current, into which the floating hops are drawn, the entire quantity being soon thoroughly steeped in the liquor.

When the liquor has been brought to the required temperature and maintained at the same for the proper length of time, the instrument is removed and the extract is drawn off and cooled, as usual.

By the use of this instrument the labor of several attendants is dispensed with, as one man can easily conduct the entire mashing operation; and I have found by repeated experiments that the mash is more quickly made, the soluble portions of the malt are more thoroughly extracted, and a much better liquor is produced at a less cost than by the ordinary process.

By the use of this instrument, also, I am enabled to substitute a wooden vat, costing but a few hundred dollars, for the ordinary copper, which costs several thousand, while the burning of the material, which frequently occurs when a copper is used, is effectually prevented.

Although I have described this instrument as used in connection with a brewing apparatus, it may be employed in almost any instance where a fluid or semi-fluid material has to be agitated or heated—as, for instance, for obtaining decoctions used by dyers and others; and I believe that it could be used with great effect for removing sand-bars in rivers, and for other similar purposes.

Although the tube A has been described and shown as bent to a right angle, it may be straight or of any other form desired.

Without confining myself to the shape or arrangement of the parts herein described, I claim as my invention and desire to secure by Letters Patent—

A tube, A, in combination with an internal pipe, B, and with a tube, C, communicating with the said pipe B and with a steam-boiler, substantially as and for the purpose described.

In testimony whereof I have signed my name to this specification in the presence of two subscribing witnesses.

GEORGE NEBEKER.

Witnesses:
  CHARLES E. FOSTER,
  JOHN WHITE.